Patented Sept. 1, 1925.

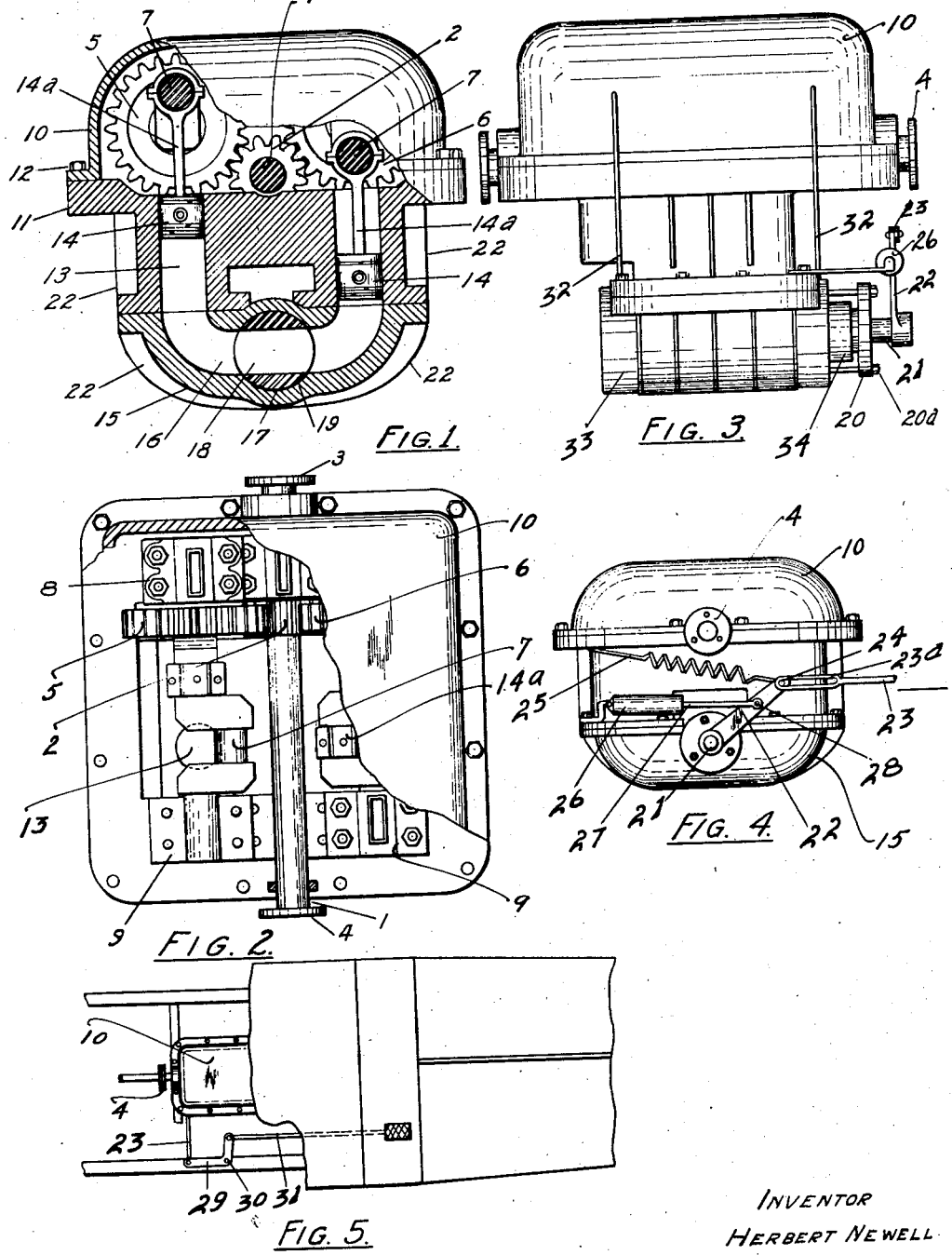

1,552,226

UNITED STATES PATENT OFFICE.

HERBERT NEWELL, OF PORTLAND, OREGON.

TRANSMISSION BRAKE.

Application filed January 23, 1924, Serial No. 687,978. Renewed July 16, 1925.

*To all whom it may concern:*

Be it known that I, HERBERT NEWELL, a citizen of the United States, and a resident of Portland, in the county of Multnomah and the State of Oregon, and having his address at 1622 5th Avenue southwest, in said city and State, have invented a new and useful Improvement in a Transmission Brake, of which the following is a specification.

My invention relates to transmission brakes for use on reduction gears for ship propulsion, machine tool drives, automotive transmission, locomotive brakes and in fact wherever reduction in speeds is required or a stopping and starting is necessary or heavy loads are to be stopped at intervals whether the same be of a sudden nature or quick stops are to be made, and my invention is of a simple nature, substantial of construction, made of the fewest parts and consists of well known principles of construction and utilizes material of a liquid nature and I may utilize such liquids as oil or the like that will give the least friction and wear in its use and will at the same time afford the greatest amount of positive lubrication while under pressure.

The invention primarily consists of a transmission shaft having collars on either end and mounted upon a base frame within bearings and having a reduction member attached thereto engaging one or more reduction transmission members engaging the same secured to a crank shaft to which are attached piston rods and a piston operating within a cylinder and a bypass across which passes a valve shaft and a passage way therethrough and an operating lever for controling the operation of the same by manual or other means.

To make my invention flexible and have ease and safety of operation I have here shown four pistons and cylinders set opposite each other and balanced as to diameter, stroke, and number; two on either side but I do not wish to be limited to any number of pistons and cylinder for it will be obvious that for greater loads and high speeds it may require a larger number of these pistons and cylinders to afford flexibility to the transmission whereas for slow acting machine a smaller number may be used. I have shown but one passageway through the valve, and in this I do not wish to be limited as in practice more than one opening may be found to be essential. To prevent the sudden stopping of the transmission brake and the consequent shock that will follow I have provided a flexible control on the lever wherein if the control lever is forcibly and quickly thrown over the valve will take a short period of time in closing.

For a better and more complete description of my invention reference is had to the accompanying drawings, in which—

Fig. 1 is an end and partial section view of my assembled device showing the detailed construction of the same, Fig. 2 is a plan and partial section view of the same, Fig. 3 is a side view of the exterior of the assembled device, Fig. 4 is an enlarged and partial section view of the control lever and Fig. 5 is a detailed section view of the flexible control feature of the operating lever.

Like reference characters refer to like parts throughout the several views.

1 is the transmission shaft that runs transversely of the transmission case and has a transmission member 2 attached thereto and having collars or flanges 3 and 4 attached thereto, one on the driven end and the other on the driving end, these collars or flanges are arranged for attachment to like members to be attached thereto and may be so made as to meet the requirements of the different character of work for which they are intended to be used for a flexible coupling may be interposed at this point to permit of a certain flexibility between this connection and the member to be attached thereto. 5 and 6 are transmission members arranged to engagement with the member 2. 7 is a crank shaft held in alignment by the bearings 8 and 9 and are covered by the case or housing 10 that is secured to the frame 11 by fastening bolts 12 and it is highly desirable that a close fit be made between these two members for the fluid to be used as the braking medium will be made to fill the voids in this space to act as a seal above the operating cylinders and pistons to replenish any leakage that may occur in the space below and to prevent the admission of air thereinto. 13 are cylinders in the frame and into which pistons 14 are made to operate, the said pistons will have piston rings of approved and close fitting design attached in grooves therein and for the purpose of making a close working fit between the cylinder and the pistons. Piston rods 14ª are made to connect the pistons with the crank rods, 15 is a housing that is made to closely connect with the frame and to prevent leakage and 16 is a passage way that connects through a valve to like passage ways and cylinders on the opposite side of the case and the same being of like size and number makes a balanced mechanism. 17 is a valve shaft having one or more passage ways 18 therethrough in the passage way 16 and is held in place in the bearing 19 the stem of the valve 17 passes through the stuffing box 20 having take up bolts 20ª and passes to the outside as shown at 21 in Fig. 3, to this valve stem 21 an operating lever 22 is attached which is for the direct purpose of rotating the valve to restrict the opening, through which the operating and controlling liquids are to be pumped. 22ª are fins on the outside of the casting for the purpose of cooling for if the liquids are forced through a restricted opening for a long period considerable heat may be developed. A connecting rod 23 is attached to the lever 22 by means of a pin or bolt on its one end and on its other end it is attached to a bell crank 29 being journaled about pin 30. The connecting rod 31 is attached to the other end of the bell crank and is connected directly to a foot lever. This lever system as described is intended for automotive controls, but for other and different uses a different method may be employed and I do not, therefore wish to be limited in my claims to this method of lever control. To afford a flexibility to the control and to prevent the positive shutting off, or the positive closing of the valve abruptly, I have attached a cylinder and dash pot arrangement to prevent the abrupt and positive closing of the valve in which spring 25 is attached on its one end to the case, and at the other end to the lever 22, the rod 23 has a slot 23ª and the tension of the spring tends to hold the same in the position as shown in Fig. 4, also attached to the lever 22 is a piston rod 27 having a piston operating therewith within the cylinder 26 which is also attached to the case, this cylinder is filled with oil or other liquids and the piston has an opening through which the liquid is permitted to pass when the piston is operated. When pressure is applied in the direction indicated by the arrow in Fig. 4 the rod 23 moves along the pin 24 at which time the spring 25 is directly applied to the operating lever and the same is actuated by the action of the spring and the speed of closing is dependent upon the rapidity of the flow of the liquid within the cylinder through the orifice of the piston therein. 33 and 34 are coverings over the ends of the housing and cover the openings in the case through which the valve 17 pass and there is more or less leakage of oil past these bearings. To prevent the waste of this oil and to insure its return to the oil supply within the sump within casing 10 overflow return pipes 32 are provided that connect the space for overflow and the casing 10.

Having thus described my invention I wish to make the following claims therefor—

1. A transmission brake comprising a collared transmission shaft, a base frame adapted to having the transmission shaft journaled therein, a pinion secured to the shaft, gears coacting with the pinion said gears secured to crank shafts, bearings for the crank shafts, connecting rods and pistons adapted to being operated by the crank shafts, cylinders within the base frame having the pistons coacting therein, a valve and controlling levers adapted to have liquids pumped through the valve and rotation means to restrict the size of the passage through the valve and housing means attached to the base frame to maintain liquids therein under pressure.

2. A transmission brake comprising a base frame, having cylinders adapted to the operating of pistons as pumps therein, liquid maintaining reservoirs disposed upon either side of the base frame and adapted to the supplying of liquid to the cylinders at the inlet and outlet ends, a transmission shaft and pinion journaled within the housing upon the base frame, gears adapted to being driven by the pinion and secured to crank shafts also mounted in bearings upon the base frame, pistons and piston rods adapted to operating as pumps within cylinders, a valve disposed between the cylinders adapted to being operated from the exterior of the base frame and the liquid maintaining reservoirs.

3. A transmission brake comprising liquid reservoirs, pumping means adjacent the reservoirs adapted to maintaining pressure in the liquid, a transmission shaft attached to the pumping means through gearing, a valve disposed in the channel of the pumped liquid adapted to being regulated, as to the opening through which the liquid is to be pumped, from the exterior and means for attaching prime movers to the transmission shaft.

4. A transmission brake comprising a transmission shaft having flanged ends and a pinion mounted thereupon and journaled upon a frame, gears coacting with the pinion to operate crank shafts, connecting rods and pistons within cylinders to pump liquids under pressure, liquid maintaining reservoirs adapted to maintain liquids under pressure, a channel adapted to having liquids pumped therethrough under pressure and having a valve disposed across the channel adapted to being regulated from the exterior by control levers adapted to the closing of the valve at a predetermined rate and piped means for returning leaked liquids to the liquid containing reservoirs.

HERBERT NEWELL.